US012761463B2

(12) United States Patent
Namazi et al.

(10) Patent No.: US 12,761,463 B2
(45) Date of Patent: Oct. 13, 2026

(54) SYSTEMS AND METHODS FOR TUNING OPTICAL CAVITIES USING MACHINE LEARNING TECHNIQUES

(71) Applicant: Qunnect, Inc., Brooklyn, NY (US)

(72) Inventors: Mehdi Namazi, Brooklyn, NY (US); Mael Flament, Brooklyn, NY (US); Rourke Sekelsky, Stonybrook, NY (US); Michelle Fritz, Brooklyn, NY (US); Gabriel Bello Portmann, Stonybrook, NY (US)

(73) Assignee: Qunnect, Inc., Brooklyn, NY (US)

( * ) Notice: Subject to any disclaimer, the term of this patent is extended or adjusted under 35 U.S.C. 154(b) by 853 days.

(21) Appl. No.: 18/021,986

(22) PCT Filed: Aug. 18, 2021

(86) PCT No.: PCT/US2021/046507
§ 371 (c)(1),
(2) Date: Feb. 17, 2023

(87) PCT Pub. No.: WO2022/040316
PCT Pub. Date: Feb. 24, 2022

(65) Prior Publication Data

US 2023/0305287 A1 Sep. 28, 2023

Related U.S. Application Data

(60) Provisional application No. 63/067,133, filed on Aug. 18, 2020.

(51) Int. Cl.
*G02B 26/00* (2006.01)
*G06N 3/092* (2023.01)

(52) U.S. Cl.
CPC ........... *G02B 26/001* (2013.01); *G06N 3/092* (2023.01)

(58) Field of Classification Search
CPC .. G02B 26/001; G02B 27/0012; G06N 3/092; G06N 3/0442; G06N 3/084; G06N 3/09;
(Continued)

(56) References Cited

U.S. PATENT DOCUMENTS 4,389,090 A 6/1983 LeFevre
4,729,662 A 3/1988 O'Brien
(Continued)

FOREIGN PATENT DOCUMENTS

CN 106981819 A 7/2017
JP 2001-208911 A 8/2001
(Continued)

OTHER PUBLICATIONS

EP 21859061.0, Aug. 1, 2024, Extended European Search Report.
(Continued)

*Primary Examiner* — Hwa Andrew Lee
(74) *Attorney, Agent, or Firm* — Wolf, Greenfield & Sacks, P.C.

(57) ABSTRACT

An optical system including an optical cavity and a method of tuning an optical cavity using a machine learning model is provided. The method includes determining a tuning parameter of the optical cavity by: analyzing, using a convolutional neural network (CNN) model, a measurement signal obtained from the optical cavity to determine a degree of misalignment of the optical cavity; and determining, using a reinforcement learning (RL) model, the tuning parameter based on the degree of misalignment of the optical cavity.

20 Claims, 7 Drawing Sheets

(58) Field of Classification Search
CPC ........ G06N 3/048; G06N 10/40; G06N 20/20; G06N 3/0464; G01J 3/26; G02F 1/213; G06V 10/70
See application file for complete search history.

(56) References Cited

U.S. PATENT DOCUMENTS

| | | | |
|---|---|---|---|
| 6,522,749 B2 | 2/2003 | Wang | |
| 8,265,280 B2 | 9/2012 | Lee et al. | |
| 12,361,308 B2 | 7/2025 | Flament et al. | |
| 2002/0089723 A1 | 7/2002 | Patel et al. | |
| 2003/0020925 A1 | 1/2003 | Patel et al. | |
| 2007/0116286 A1 | 5/2007 | Yuan et al. | |
| 2008/0258049 A1 | 10/2008 | Kuzmich et al. | |
| 2010/0014543 A1* | 1/2010 | Ogilvy | H01S 3/109 372/19 |
| 2011/0216311 A1 | 9/2011 | Kachanov et al. | |
| 2014/0369374 A1 | 12/2014 | Huber et al. | |
| 2015/0103343 A1 | 4/2015 | Smith et al. | |
| 2015/0236791 A1 | 8/2015 | Nordholt et al. | |
| 2016/0026930 A1 | 1/2016 | Cheng et al. | |
| 2017/0343750 A1 | 11/2017 | Ashrafi | |
| 2018/0287710 A1 | 10/2018 | Komatsu | |
| 2019/0005069 A1 | 1/2019 | Filgueiras de Araujo et al. | |
| 2019/0393965 A1 | 12/2019 | Zhang et al. | |

FOREIGN PATENT DOCUMENTS

| | | |
|---|---|---|
| JP | 2004-280117 A | 10/2004 |
| JP | 2009-053458 A | 3/2009 |
| JP | 2016-540245 A | 12/2016 |
| JP | 2018-101025 A | 6/2018 |
| JP | 2019-148655 A | 9/2019 |
| JP | 2020-509716 A | 3/2020 |
| WO | WO 2019/191442 A1 | 10/2019 |

OTHER PUBLICATIONS

Extended European Search Report dated Aug. 1, 2024, in connection with European Application No. 21859061.0.
Ricci, A neural system for frequency control of tunable laser sources. IEEE Instrumentation and Measurement Technology Conference. May 19-21, 1997. pp. 251-256.
International Preliminary Report on Patentability dated Mar. 16, 2023, in connection with International Application No. PCT/US2021/49052.
International Search Report and Written Opinion dated May 12, 2022, in connection with International Application No. PCT/US2021/49052.
International Search Report and Written Opinion dated Dec. 8, 2021, in connection with International Application No. PCT/US2021/46507.
International Preliminary Report on Patentability dated Mar. 2, 2023, in connection with International Application No. PCT/US2021/46507.
[No Author Listed], Quantum Networks for Open Science Workshop. DOE. Sep. 25-26, 2018. https://info.ornl.gov/sites/publications/Files/Pub124247.pdf [last accessed Mar. 20, 2023] 43 pages.
[No Author Listed], A Strategic Vision For America's Quantum Networks. The White House's National Quantum Coordination Office. Feb. 2020. 4 pages.
Baumeister et al., Deep Learning and model predictive control for self-tuning mode-locked lasers. ArXiv:1711.02702. 2018. pp. 617-626.
Doster et al., Machine learning approach to OAM beam demultiplexing via convolutional neural networks. Applied Optics. Apr. 2017. 20:56(12). 11 pages.
Gregor et al., Temporal difference variational auto-encoder. ArXiv:1806.03107. Jan. 2, 2019. 17 pages.
Higgins et al., Practical Polarization-Frame Alignment For Quantum Key Distribution With Single-Photon-Level Resources. Oct. 9, 2018. 11 pages. arXiv:1810.04112.
Ma et al., Polarization Recovery and Auto-Compensation in Quantum Key Distribution Network. Quantum Communications and Quantum Imaging IV. SPIE. Aug. 30, 2006;6305(630513). 7 pages. doi:10.1117/142.679575.
Yu et al., Reconstruction Of A Photonic Qubit State With Reinforcement Learning. Advanced. Quantum Technologies. 2019;2(1800074). 6 pages. doi:10.1002/qute.201800074.
Xavier et al., Experimental Polarization Encoded Quantum Key Distribution Over Optical Fibers With Real-Time Continuous Birefringence Compensation. New J. Phys. Apr. 30, 2009;11(045015). 14 pages. doi:10.1088/1367-2630/11/4/045015.
Xin et al., Local-Measurement-Based Quantum State Tomography Via Neural Networks. npj Quantum Information. 2019;5(109). 8 pages. doi.org/10.1038/s41534-019-0222-3.
Japanese Office Action dated Jul. 1, 2025, in connection with Japanese Application No. JP 2023-507266.
Japanese Office Action dated Aug. 19, 2025, in connection with Japanese Application No. JP 2023-507348.
Japanese Notice of Allowance dated Nov. 7, 2025, in connection with Japanese Application No. 2023-507266, with English translation thereof.
Japanese Notice of Allowance dated Nov. 27, 2025, in connection with Japanese Application No. 2023-507348, with English translation thereof.

* cited by examiner

SYSTEMS AND METHODS FOR TUNING OPTICAL CAVITIES USING MACHINE LEARNING TECHNIQUES

CROSS-REFERENCE TO RELATED APPLICATIONS

This application is a national stage filing under 35 U.S.C. § 371 of International Patent Application Serial No. PCT/US2021/046507, filed Aug. 18, 2021, entitled "SYSTEMS AND METHODS FOR TUNING OPTICAL CAVITIES USING MACHINE LEARNING TECHNIQUES", which claims priority under 35 U.S.C. § 119(e) to U.S. Provisional Application Ser. No. 63/067,133, filed Aug. 18, 2020, and titled "MACHINE LEARNING AUTOMATED TUNING OF OPTICAL CAVITIES," each of which is incorporated by reference in its entirety herein.

BACKGROUND

Optical resonating cavities can be used to form high-quality spectral filters, in which large signal-to-noise ratios may be achieved. Optical cavities are formed by a combination of reflecting surfaces and/or mirrors. As light is incident upon the first mirror, a small portion of the optical field enters the resonator and propagates between the mirrors while a majority of incident light on the cavity is reflected. However, if the optical cavity length is a multiple of the wavelength of incoming light, standing waves are formed within the optical cavity, resulting in constructive interference. Under these conditions, selective transmission of the resonant wavelength is achieved, while other wavelengths of light may be back-reflected and/or absorbed. The path length between mirrors within an optical cavity, amongst other parameters, is used to tune the resonant properties of the optical cavity.

SUMMARY

Some embodiments provide for a method of tuning an optical cavity, the method comprises: determining a tuning parameter of the optical cavity, wherein determining the tuning parameter comprises: analyzing, using a convolutional neural network (CNN) model, a measurement signal obtained from the optical cavity to determine a degree of misalignment; and determining, using a reinforcement learning (RL) model, the tuning parameter based on the degree of misalignment; and tuning the optical cavity using the tuning parameter.

Some embodiments provide for at least one computer-readable storage medium encoded with computer-executable instructions that, when executed by a computer, cause the computer to carry out a method. The method comprises: analyzing, using a convolutional neural network (CNN) model, a measurement signal obtained from the optical cavity to determine a degree of misalignment; and determining, using a reinforcement learning (RL) model, the tuning parameter based on the degree of misalignment; and tuning the optical cavity using the tuning parameter.

In some embodiments, determining the degree of misalignment comprises using the CNN model to determine a difference between the measurement signal and a standard operating signal.

In some embodiments, determining the difference between the measurement signal and the standard operating signal comprises determining a difference between the measurement signal and a spatial profile image comprising a Gaussian zero-order mode.

In some embodiments, determining the tuning parameter comprises generating the tuning parameter using the RL model, the tuning parameter being based on the determined difference between the measurement signal and the standard operating signal.

In some embodiments, the method further comprises determining, using a machine learning model, when to determine the tuning parameter of the optical cavity based on a threshold transmission value. In some embodiments, the threshold transmission value is 90% transmission.

In some embodiments, the method further comprises determining when to determine the tuning parameter of the optical cavity based on a temperature measurement of the optical cavity and/or an environment of the optical cavity, the temperature measurement obtained from a temperature sensor.

In some embodiments, tuning the optical cavity using the tuning parameter comprises changing a spacing between cavity walls of the optical cavity based on the tuning parameter.

In some embodiments, tuning the optical cavity using the tuning parameter comprises changing a reflectivity of one or more mirrors of the optical cavity based on the tuning parameter. In some embodiments, changing the reflectivity of the one or more mirrors comprises changing a temperature of the optical cavity.

In some embodiments, changing the spacing between the cavity walls of the optical cavity comprises changing a temperature of the optical cavity.

In some embodiments, changing the spacing between the cavity walls of the optical cavity comprises using piezoelectric actuators.

In some embodiments, analyzing the measurement signal comprises analyzing a measurement of light exiting the optical cavity.

In some embodiments, the method includes capturing the measurement of light using a two-dimensional detector array disposed in a plane perpendicular to a direction of the light exiting the optical cavity. In some embodiments, capturing the measurement of light comprises capturing a spatial profile of the light exiting the optical cavity. In some embodiments, capturing a spatial profile of the light exiting the optical cavity comprises capturing information characterizing a transverse-spatial mode of the optical cavity.

In some embodiments, the method includes comprising capturing the measurement of light using a photodetector. In some embodiments, capturing the measurement of light comprises capturing an intensity and/or a power spectrum of the light using the photodetector.

In some embodiments, the method further comprises training the CNN model using a set of images generated based on a physical model and/or a set of images generated by controlled parameter exploration of the optical cavity.

In some embodiments, the method further comprises periodically obtaining the measurement signal from the optical cavity, classifying the measurement signal using the CNN model, determining the tuning parameter of the optical cavity using the RL model, and tuning the optical cavity.

In some embodiments, the method further comprises sorting, using the CNN model, the measurement signal using a stochastic optimization algorithm. In some embodiments, sorting the measurement signal using a stochastic optimization algorithm comprises using an Adam algorithm.

In some embodiments, the method further comprises sorting the measurement signal using the RL model. In some embodiments, the sorting comprises sorting the measurement signal using a number of steps taken by piezoelectric actuators driving mirror mounts of the optical cavity between a current position and the position that produces a $TEM_{00}$ optical mode.

In some embodiments, using the CNN model comprises using a CNN model having an architecture comprising seven convolutional layers, two fully connected layers, three max-pooling layers, one or more ReLU activation layers, and one softmax activation layer.

Some embodiments provide for a method of tuning two or more optical cavities. The method comprises: determining a first tuning parameter associated with a first optical cavity and a second tuning parameter associated with a second optical cavity, wherein determining the first and second tuning parameters comprising analyzing, using a convolutional neural network (CNN) model and a reinforcement learning (RL) model, a measurement signal obtained from the second optical cavity; and tuning the first and second optical cavities using the first and second tuning parameters.

Some embodiments provide for an optical system. The optical system comprises: an optical cavity; at least one processor coupled to the optical cavity; and at least one computer-readable storage medium storing computer-executable instructions that, when executed by the at least one processor, cause the at least one processor to carry out a method. The method comprises: analyzing, using a convolutional neural network (CNN) model, a measurement signal obtained from the optical cavity to determine a degree of misalignment; and determining, using a reinforcement learning (RL) model, the tuning parameter based on the degree of misalignment; and tuning the optical cavity using the tuning parameter.

In some embodiments, analyzing the measurement signal comprises using the CNN model to determine a difference between the measurement signal and a standard operating signal.

In some embodiments, determining the difference between the measurement signal and the standard operating signal comprises determining a difference between the measurement signal and a spatial profile image comprising a Gaussian zero-order mode.

In some embodiments, determining the tuning parameter comprises generating the tuning parameter using the RL model, the tuning parameter being based on the difference between the measurement signal and the standard operating signal determined by the CNN model.

In some embodiments, the optical cavity comprises a high finesse optical cavity. In some embodiments, the high finesse optical cavity comprises an optical cavity comprising a finesse value greater than or equal to 100 and less than or equal to 20,000. In some embodiments, the high finesse optical cavity comprises a Fabry-Perot etalon.

In some embodiments, the optical cavity comprises a cavity wall comprising a surface that is flat, concave, convex, or a combination thereof. In some embodiments, the surface comprises a reflective coating.

In some embodiments, the optical system further comprises a detector disposed in a plane perpendicular to a direction of light exiting the optical cavity. In some embodiments, the detector comprises a detector array having a resolution greater than 256×256 pixels.

In some embodiments, the measurement signal is obtained from a measurement, by the detector array, of the light exiting the optical cavity. In some embodiments, the measurement signal is an image of a spatial profile of the light exiting the optical cavity, the image characterizing a transverse spatial mode of the optical cavity.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
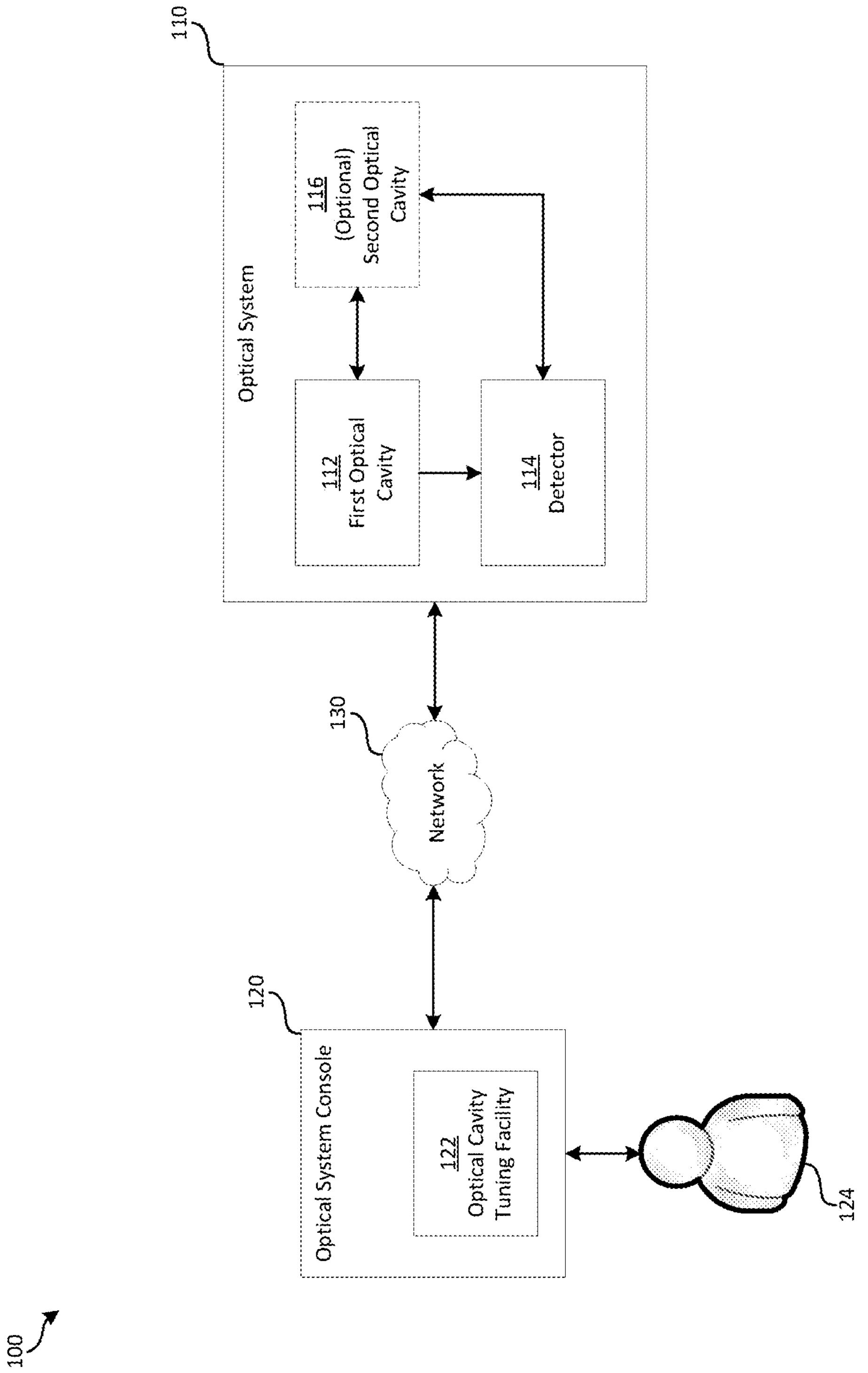
FIG. 1 is a schematic block diagram of an example of a facility for performing optical cavity tuning processes, in accordance with some embodiments described herein.

Described herein are techniques for tuning the parameters of an optical system (e.g., including an optical cavity) using a convolutional neural network (CNN) model and a reinforcement learning (RL) algorithm (e.g., Actor-Critic, A2C). These techniques include methods of determining a tuning parameter (e.g., to change a property of the optical cavity) by analyzing, using the CNN model and/or the RL algorithm, a measurement signal obtained from an output of the optical cavity. For example, the CNN model can be provided an image of a spatial profile of the light exiting the optical cavity or a measurement of an intensity and/or power spectrum of the light exiting the optical cavity. The CNN model can use this measurement signal to predict a degree of misalignment of the optical cavity relative to a desired optical mode (e.g., a Gaussian zeroth-order mode). Then, based on the predicted degree of misalignment, the RL algorithm can generate a tuning parameter that can be used to tune the optical properties of the optical cavity and improve the performance of the optical system (e.g., by increasing transmission of the optical system).

Optical cavities are used in numerous applications including lasers, laser spectroscopy, optical parametric amplifiers, optical frequency metrology, nonlinear optical devices and cavity quantum electrodynamics. In general, they are used to extend the interaction time between matter and an electromagnetic (EM) field, such as gain media in lasers. They can also impose a well-defined mode structure on the EM field, and support both mode and frequency matching and locking schemes for optical systems.

Components of quantum optical networks (e.g., photon sources, detectors, memories, entanglement swapping nodes) function at single-photon levels and at precise wavelengths. Optical cavities are used in order to achieve high signal-to-noise ratios, enabling accurate and efficient communication between components (e.g., to perform quantum state tomography, entanglement swapping). A significant challenge in the implementation of quantum optical networks is the separation of photons carrying quantum information from background photons, which preferably may be isolated by greater than 100 dB. This high degree of isolation is particularly important in the development and practical implementation of quantum technologies that function in real environmental conditions (e.g., at or around room temperature). Standard optical filtering methods (e.g., dichroic filtering, absorbance filtering) are insufficient to isolate single-photon signals from background noise under such conditions.

To achieve the desired ultra-narrowband tunable filtering, one solution is to use a Fabry-Perot (FP) interferometer (e.g., an FP cavity, or an etalon), a type of optical cavity configured to transmit light of a wavelength which is in resonance with the cavity. High finesse (e.g., wherein $f>100$) of FP optical cavities is achievable. However, such optical cavities become increasingly unstable as the finesse rises and the bandwidth narrows, resulting in limited transmission and/or fidelity of propagating signals. Furthermore, these cavities are highly sensitive to environmental fluctuations (e.g., temperature fluctuations), making it challenging maintain alignment over long periods of time when deployed in non-controlled environments.

The proper alignment and calibration of optical equipment (e.g., optical resonator cavities) relies on several strategies and on the fine-tuning of many parameters. To date, no comprehensive solutions exist for fully autonomous, self-tuning optical cavities. Remotely controllable implementations exist (e.g., temperature or mechanically tunable) but still require a manually-operated interface to implement tuning of the optical equipment. When aligning optical cavities, one can observe the transverse spatial mode ("Hermite-Gaussian" mode) exiting the cavity, and then adjust the cavity length and temperature to produce a zero-order mode ("Gaussian" mode). This manual tuning process, and more broadly that of complex optical assemblies including mirrors (e.g., alignment) and lenses (e.g., mode matching) and other optical elements (e.g., waveplates, polarizers), remains tedious, highly inefficient, and imprecise. This problem is significantly compounded when multiple cavities are disposed in-line with each other for the desired application or when such cavities are used in conjunction with quantum applications, which frequently suffer from long-term drift.

The inventors have recognized and appreciated that machine learning techniques may be applied to such optical instrumentation in order to implement self-maintaining optical systems. Such self-maintenance may be particularly useful for calibrating and preserving sophisticated photonic equipment for remote deployment (e.g., for long-range telecommunications systems).

The inventors have additionally recognized and appreciated that machine learning techniques may be used to minimize inoperative downtime of self-maintaining optical systems by optimizing when self-maintenance is performed. For example, machine learning techniques (e.g., time series analysis (TSA), TSA using recurrent neural networks (RNNs) or long short-term memory networks (LSTMs), gradient boosted trees, ensemble models) may be used to predict how frequently self-maintenance needs to be performed, rather than periodically performing such maintenance (e.g., every hour). The predictions may be performed using, for example, environmental information (e.g., temperature measurements). Alternatively, such machine learning techniques may be used to predict when to perform self-maintenance to maintain a threshold transmission value (e.g., to maintain a 90% transmission value) rather than maintaining a maximum transmission value to optimize the amount of operational time of the optical system.

The inventors have further recognized and appreciated that machine learning techniques that automatically monitor and stabilize optical cavity performance may be advantageous for a broad range of photonic applications, including telecommunications, quantum technologies, hyperspectral remote sensing, and other optical applications. Quantum devices which support distributed sensing, quantum communication, or light-based information processing architecture, are an example of the use of ultra-narrowband frequency filtering optical cavities.

Additionally, the inventors have recognized and appreciated that the use of machine learning techniques to implement self-maintaining optical systems may be applied to many additional optical instrumentation systems, including: precision spectroscopy (e.g. composition detection), laser resonators (e.g. laser amplifiers, light frequency doubling, Q-sensing), precision frequency filtering (e.g. quantum applications), transverse radiative mode filtering (e.g. free-space communications), optical frequency standards (e.g. phase locks, atomic clocks), and precision length measurements (e.g. metrology, LIDAR).

Accordingly, the inventors have developed systems and methods for tuning the properties of optical systems using machine learning techniques. In some embodiments, the method includes determining (e.g., automatically or manually) a tuning parameter (e.g., to be used to change an optical property) of an optical cavity by analyzing, using a convolutional neural network (CNN) model, a measurement signal obtained from the optical cavity. A measurement signal may be, for example, a measurement of light exiting the optical cavity (e.g., an image of a spatial profile of the light exiting the optical cavity, the integrated intensity of the light exiting the optical cavity). The reinforcement learning (RL) model may use an output of the CNN model to determine a degree of misalignment of the optical cavity relative to a desired optical mode (for example, a Gaussian zeroth-order mode). The method may include tuning the optical cavity using the tuning parameter determined by the RL model.

In some embodiments, the CNN model may be a two-dimensional CNN model, and its architecture may include a number of convolutional layers, fully connected layers, max-pooling layers, and/or various activation layers (e.g., ReLU layers, softmax layers). For example, the CNN model may include seven convolutional layers, two fully connected layers, three maxpooling layers, and one softmax prediction layer.

In some embodiments, the CNN model may first be trained using simulated spatial modes (e.g., from a simulated optical cavity) and then may be further trained and refined using outputs from a physical system (e.g., a real-world optical system). In the context of optical cavity alignment, the RL algorithm may be trained using a policy system that determines rewards as a function of output beam quality from the optical cavity. In some embodiments, the optical system includes an optical cavity (e.g., an FP optical cavity), at least one processor coupled to the optical cavity, and at least one computer-readable storage medium storing instructions that, when executed by the at least one processor, cause the at least one processor to carry out a method as described above. In some embodiments, the optical system may additionally include a detector array configured to monitor (e.g., by imaging light exiting the optical cavity) the optical cavity.

FIG. 1 is a schematic block diagram of an example of a facility 100 for performing optical cavity tuning processes, in accordance with some embodiments described herein. In the illustrative example of FIG. 1, facility 100 includes an optical system 110 and an optical system console 120. It should be appreciated that facility 100 is illustrative and that a facility may have one or more other components of any suitable type in addition to or instead of the components illustrated in FIG. 1. For example, there may be a remote system present within a facility.

As illustrated in FIG. 1, in some embodiments, the optical system 110 and the optical system console 120 may be communicatively connected by a network 130. The network 130 may be or include one or more local- and/or wide-area, wired and/or wireless networks, including a local-area or wide-area enterprise network and/or the Internet. Accordingly, the network 130 may be, for example, a hard-wired network (e.g., a local area network within a facility), a wireless network (e.g., connected over Wi-Fi and/or cellular networks), a cloud-based computing network, or any combination thereof. For example, in some embodiments, the optical system 110 and the optical system console 120 may be located within a same facility and connected directly to each other or connected to each other via the network 130.

In some embodiments, the optical system console 120 may be configured to tune parameters of, adjust, and/or perform maintenance on a component within the optical system 110 (e.g., first and/or second optical cavities 112 and 116). The optical system 110 may include a first optical cavity 112, optionally a second optical cavity 116 coupled to the first optical cavity 112, a detector 114 configured to measure an output signal from the first and/or second optical cavities 112 and 116, and optionally a temperature sensor 118 configured to measure a temperature of the first and/or second optical cavities 112 and 116 and/or to measure a temperature of the environment of the optical system.

In some embodiments, the first optical cavity 112 and optional second optical cavity 116 may be a high finesse optical cavity. For example, the first and/or second optical cavities 112 and/or 116 may have a finesse value within a range from 100 to 2000, from 100 to 5000, from 100 to 20,000, or from 100 to 750,000, or within any range within those ranges, depending on the application.

In some embodiments, the first and/or second optical cavities 112 and/or 116 may be, in some embodiments, a Fabry-Perot etalon. The first and/or second optical cavities 112 and/or 116 may include a cavity wall comprising a reflective surface (e.g., due to a reflective coating) that is flat, concave, or convex in shape. In some embodiments, the first and/or second optical cavities 112 and/or 116 may include two opposing cavity walls, each comprising a reflective surface. The two opposing cavity walls may each be flat, concave, or convex in shape, and may be different in shape. In some embodiments, the reflective surfaces may be controlled by actuators (e.g., piezoelectric actuators) to change their positioning (e.g., to change an angle of the reflective surface and/or to change a distance between the reflective surfaces).

In some embodiments, the detector 114 may be optically coupled to an output of the first optical cavity 112 and/or, optionally, to an output of the second optical cavity 116. In some embodiments, the detector 114 may be a two-dimensional detector array disposed in a plane perpendicular to a direction of light exiting the first and/or second optical cavities 112 and 116. For example, the detector 114 may be a photodiode array, a phototransistor array, or any other suitable detector device (e.g., a high-quantum efficiency CCD camera). In some embodiments, the detector 114 may be an array with a resolution of at least 256×256 pixels. In some embodiments, the detector 114 may be a single detector rather than an array of detectors. For example, the detector 114 may be a photodiode or any other suitable optical detector configured to detect an intensity and/or a power spectrum of received light.

In some embodiments, the detector 114 may be configured to provide a measurement signal from the first and/or second optical cavities 112 and 116 to optical system console 120. The measurement signal may be obtained from a measurement, by the detector 114, of the light exiting the first and/or second optical cavity 112, 116. In some embodiments including both first and second optical cavities 112 and 116, the detector 114 may be configured to provide a measurement signal from only the second optical cavity 116 from which tuning parameters for both the first and second optical cavities 112 and 116 may be determined.

In some embodiments, the measurement signal may be an image of a spatial profile of the light exiting the optical cavity. The image may characterize a transverse spatial mode of the optical cavity. In some embodiments, the measurement signal may be data characterizing the intensity of the received optical signal. In some embodiments, the measurement signal may be data characterizing the power spectrum of the received optical signal. In such embodiments, the power spectrum may provide information about the Gaussian and/or non-Gaussian modes of the received light as a function of intensity versus time.

In some embodiments, the optical system 110 may optionally include a temperature sensor 118. The temperature sensor 118 may be configured to measure a temperature of the first and/or second optical cavities 112 and 116. Alternatively or additionally, the temperature sensor 118 may be configured to measure a temperature of the environment of the optical system. The temperature sensor 118 may be, for example, a thermocouple, a thermistor, a digital temperature sensor, and/or any other suitable type of temperature sensor.

As illustrated in FIG. 1, facility 100 includes optical system console 120 communicatively coupled to the optical system 110. Optical system console 120 may be any suitable electronic device configured to send instructions and/or information to optical system 110, to receive information from optical system 110, and/or to process obtained measured signals (e.g., obtained from detector 114). In some embodiments, optical system console 120 may be a fixed electronic device such as a desktop computer, a rackmounted computer, or any other suitable fixed electronic device. Alternatively, optical system console 120 may be a portable device such as a laptop computer, a smart phone, a tablet computer, or any other portable device that may be configured to send instructions and/or information to optical system 110, to receive information from optical system 110, and/or to process obtained measurement signals.

Some embodiments may include an optical cavity tuning facility 122 stored on optical system console 120. Optical cavity tuning facility 122 may be configured to determine a tuning parameter (e.g., to alter an optical property of first optical cavity 112 and/or second optical cavity 116) using an RL model. Optical cavity tuning facility 122 may be configured to, for example, analyze the measurement signal obtained from detector 114 by providing the measurement signal to an RL model, as described herein. Optical cavity tuning facility 122 may be implemented as hardware, software, or any suitable combination of hardware and software, as aspects of the disclosure provided herein are not limited in this respect. As illustrated in FIG. 1, the optical cavity tuning facility 122 may be implemented in the optical system console 120, such as by being implemented in software (e.g., executable instructions) executed by one or more processors of the optical system console 120. However, in other embodiments, the optical cavity tuning facility 122 may be additionally or alternatively implemented at one or more other elements of the system 100 of FIG. 1. For example, in some embodiments, the optical cavity tuning facility 122 may be implemented at the optical system 110.

In some embodiments, optical cavity tuning facility 122 may analyze the measurement signal by using the CNN model to determine a difference between the measurement signal and a standard operating signal. For examples, the CNN model may be configured to classify the measurement signal by determining a difference between the measurement signal (e.g., an image of the spatial profile of the light exiting the optical cavity characterizing a transverse-spatial mode of the optical cavity) and a spatial profile image comprising a Gaussian zero-order mode. In some embodiments, the CNN model may be configured to determine a difference between the measurement signal (e.g., an intensity value and/or a power spectrum measurement) and an ideal intensity value and/or a power spectrum corresponding to a Gaussian zero-order mode. The CNN model may determine the tuning parameter based on the determined difference between the measurement signal and the standard operating signal (e.g., the spatial profile image or the ideal intensity value and/or ideal power spectrum).

In some embodiments, the tuning parameter may be configured to change a spacing between cavity walls of the first and/or second optical cavities 112 and/or 116. For example, changing the spacing between cavity walls within the first and/or second optical cavities 112 and/or 116 may change the resonant wavelength of the first and/or second optical cavities 112 and/or 116. In some embodiments, changing the spacing between the cavity walls of the first and/or second optical cavities 112 and/or 116 may be performed by using one or more piezoelectric actuators and/or changing a temperature of the first and/or second optical cavities 112 and/or 116.

In some embodiments, the tuning parameter may be configured to change a reflectivity of one or more mirrors of the first and/or second optical cavities 112 and/or 116. For example, changing the reflectivity of one or more mirrors of the first and/or second optical cavities 112 and/or 116 may change the transmissivity of the first and/or second optical cavities 112 and/or 116. In some embodiments, changing the reflectivity of the one or more mirrors of the first and/or second optical cavities 112 and/or 116 may be performed by changing a temperature of the first and/or second optical cavities 112 and/or 116.

In some embodiments, the CNN model of the optical cavity tuning facility 122 may be trained prior to use by optical system user 124. The CNN model may, in some embodiments, be trained using theoretical simulations of cavity physics (e.g., simulated images of Hermite-Gaussian modes, simulated intensity values and/or simulated power spectrums). Alternatively or additionally, the CNN model may be trained using data acquired from a physical optical system. For example, the CNN model may first be trained using theoretical simulations and thereafter may be trained again (e.g., fine-tuned) based on data acquired from a physical optical system. In some embodiments, the CNN model may be further adjusted during operation by continuous feedback and automatic retraining (e.g., to account for alignment drifts and changes in system conditions).

Optical system console 120 may be accessed by optical system user 124 in order to perform maintenance on optical system 110. For example, optical system user 124 may implement an optical cavity tuning process by inputting one or more instructions into optical system console 120 (e.g., optical system user 124 may request an updated measurement signal from optical system 110 via optical system console 120). Alternatively or additionally, in some embodiments, optical system user 124 may implement a periodic (e.g., either at regular intervals or irregular intervals of time) optical cavity tuning procedure by inputting one or more instructions into optical system console 120.

In some embodiments, the optical cavity tuning facility 122 may implement a periodic optical cavity tuning procedure by predicting whether the optical system 110 requires maintenance. For example, the optical cavity tuning facility 122 may be configured to predict, based on environmental information (e.g., temperature information obtained from temperature sensor 118) whether the first and/or second optical cavities 112 and/or 116 require maintenance. The optical cavity tuning facility 122 may use machine learning techniques to perform such a prediction. For example, the optical cavity tuning facility 122 may use time series analysis (TSA), TSA using recurrent neural networks (RNNs) or long short-term memory networks (LSTMs), gradient boosted trees, and/or ensemble models to predict whether the optical system 110 requires maintenance. In some embodiments, the optical cavity tuning facility 122 may use the temperature information obtained from temperature sensor 118 to dynamically change a temperature of the first and/or second optical cavities 112 and/or 116 without having to send light through the first and/or second optical cavities 112 and/or 116.

As another example, in some embodiments, the optical cavity tuning facility 122 may predict whether the optical system 110 requires maintenance based on a threshold transmission value (e.g., above 90%, above 95%). In this manner, the optical cavity tuning facility 122 may reduce downtime of the optical system 110 for such self-maintenance procedures.

Figure 2:
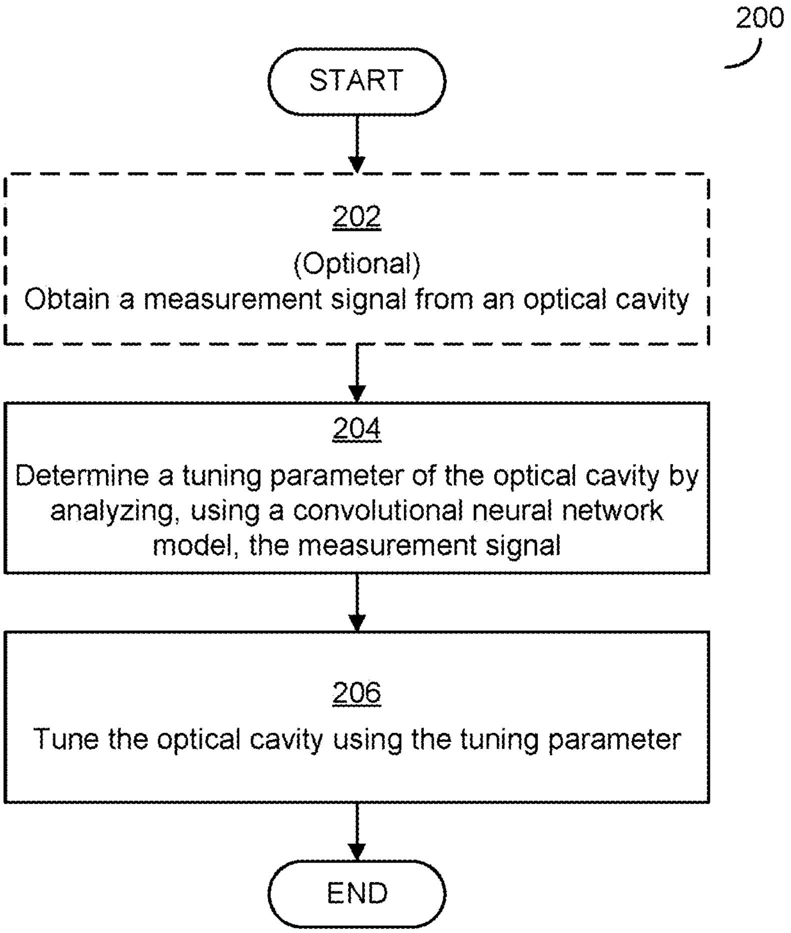
FIG. 2 is a flowchart of an illustrative process 200 of tuning an optical cavity using a machine learning pipeline including a convolutional neural network (CNN) model and a reinforcement learning (RL) algorithm, in accordance with some embodiments described herein.

FIG. 2 is a flowchart of an illustrative process 200 of tuning an optical cavity using a CNN model and an RL model, in accordance with some embodiments described herein. Process 200 may be implemented by an optical cavity tuning facility, such as the facility 122 of FIG. 1. As such, in some embodiments, the process 200 may be performed by a computing device configured to send instructions to an optical system and/or to receive information from an optical system (e.g., optical system console 120 executing optical cavity tuning facility 122 as described in connection with FIG. 1). As another example, in some embodiments, the process 200 may be performed by one or more processors located remotely (e.g., as part of a cloud computing environment, as connected through a network) from the optical system.

Process 200 may begin optionally at act 202, where a measurement signal may be obtained by the optical cavity tuning facility from an optical cavity. In some embodiments, the measurement signal may be obtained from a detector and/or detector array (e.g., detector 114, described herein). The measurement signal may be, for example, a measurement of light exiting the optical cavity (e.g., an image of a spatial profile of the light, a measurement of a characteristic of the light such as intensity and/or a power spectrum).

At act 204, the optical cavity tuning facility may determine a tuning parameter of the optical cavity by analyzing, using a CNN model and/or an RL model, the measurement signal. The CNN model may analyze the measurement signal by determining a difference between the measurement signal and a standard operating signal. For example, the CNN model may characterize a difference between a spatial profile image of the light exiting the optical cavity and a spatial profile image of a Gaussian zero-order mode. Then, the RL model may determine the tuning parameter based on the determined difference between the measurement signal and the standard operating signal.

After determining the tuning parameter, the optical cavity tuning facility may proceed to act 206, in some embodiments. In act 206, the optical cavity may be tuned using the tuning parameter. The optical cavity tuning facility may, for example, send the tuning parameter to the optical cavity and/or a control system connected to the optical cavity. In some embodiments, the tuning parameter may be configured to change a spacing between cavity walls of the optical cavity. For example, changing the spacing between cavity walls within the optical cavity may change the resonant wavelength of the optical cavity. In some embodiments, changing the spacing between the cavity walls of the optical cavity may be performed by using one or more piezoelectric actuators and/or changing a temperature of the optical cavity.

Figures 3A, 3B, 3C:
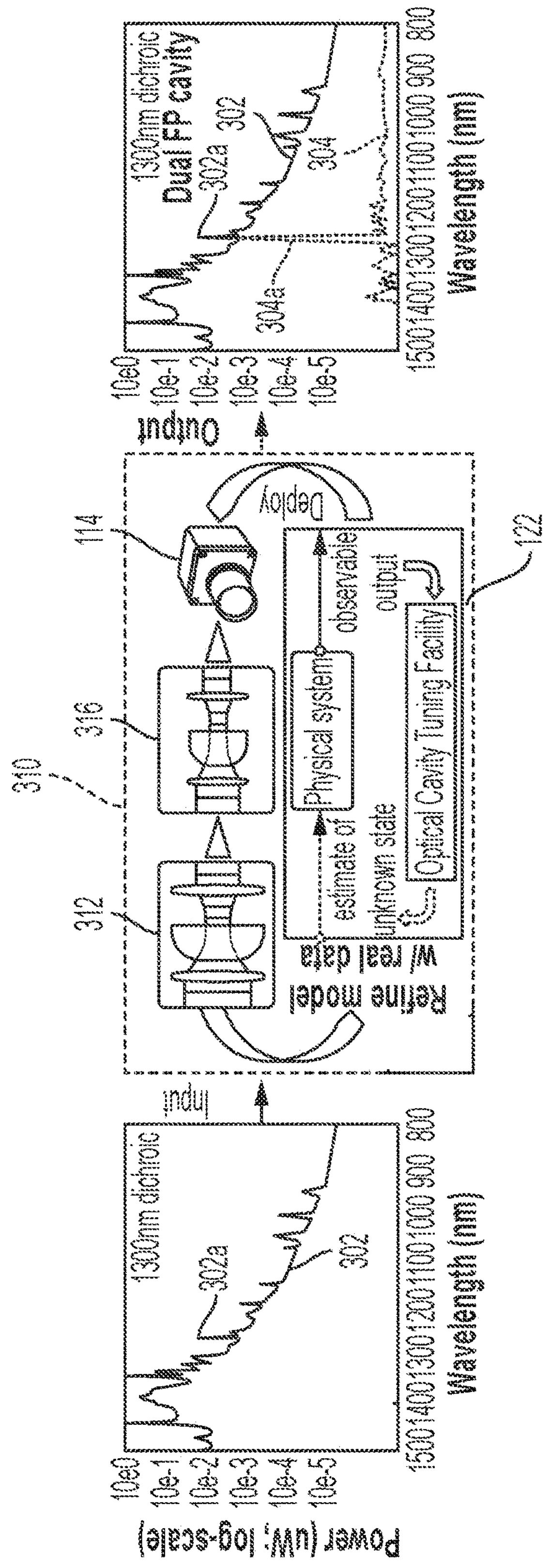
FIG. 3A shows the spectral power distribution of a photon beam after passing through a conventional dichroic filter.
FIG. 3B shows a Fabry-Perot interferometer including feedback from an optical cavity tuning facility, in accordance with some embodiments described herein.
FIG. 3C shows the spectral power distribution of a photon beam after passing through the Fabry-Perot interferometer of FIG. 3B, in accordance with some embodiments described herein.

As an example of the output of a conventional optical filter, FIG. 3A shows the spectral power distribution 302 of a photon beam after passing through a 1300 nm dichroic filter. As can be seen in the spectral power distribution 302, a peak 302*a* corresponding to the desired 1300 nm single photon signal is present in the spectral power distribution 302. However, there is still significant background signal in the spectral power distribution 302.

FIG. 3B shows illustrative optical system 310, including feedback from an optical cavity tuning facility 122, that may be used to further isolate the desired single photon signal from the spectral power distribution 302. The optical system 310 is an illustrative example of the optical system 110 as described in connection with FIG. 1 herein.

In some embodiments, the optical system 310 includes a first Fabry-Perot etalon 312 configured to receive an input optical signal (e.g., from a dichroic or absorbance filter). The first Fabry-Perot etalon 312 is configured to provide a first filtering stage and only transmits wavelengths which are in resonance with the cavity of the first Fabry-Perot etalon 312. The output of the first Fabry-Perot etalon 312 is coupled to the input of a second Fabry-Perot etalon 316. The second Fabry-Perot etalon 316 is configured to further filter the optical signal received from the first Fabry-Perot etalon 312 and only transmits wavelengths which are in resonance with the cavity of the second Fabry-Perot etalon 316. The power spectral density 304 of the optical signal output from the second Fabry-Perot etalon 316 is shown in FIG. 3C. The power spectral density 304 shows a large reduction in background noise relative to the desired 1300 nm single photon signal peak 304*a*.

In some embodiments, the output of the second Fabry-Perot etalon is coupled to a detector 114, as described in connection with FIG. 1 herein. The detector 114 sends a measurement signal to the optical cavity tuning facility 122 for analysis. The optical cavity tuning facility 122 may be configured to use the measurement signal to adjust parameters of the first and/or second Fabry-Perot etalons 312, 316. For example, the optical cavity tuning facility 122 may determine, based on the measurement signal, that a distance between cavity walls of the first and/or second Fabry-Perot etalons 312, 316 should be adjusted to alter the optical behavior of said etalons 312, 316.

The inventors have recognized and appreciated that using a machine learning-based technique (e.g., optical cavity tuning facility 122) may provide more accurate feedback to a complex optical system such as optical system 310. As the bandwidth of optical cavities such as first and second Fabry-Perot etalons 312, 316 narrows, their optical behavior can become increasingly unstable. The use of a machine learning model with reinforced learning feedback enables the control of a complex system having many coupled parameters.

Figure 4:
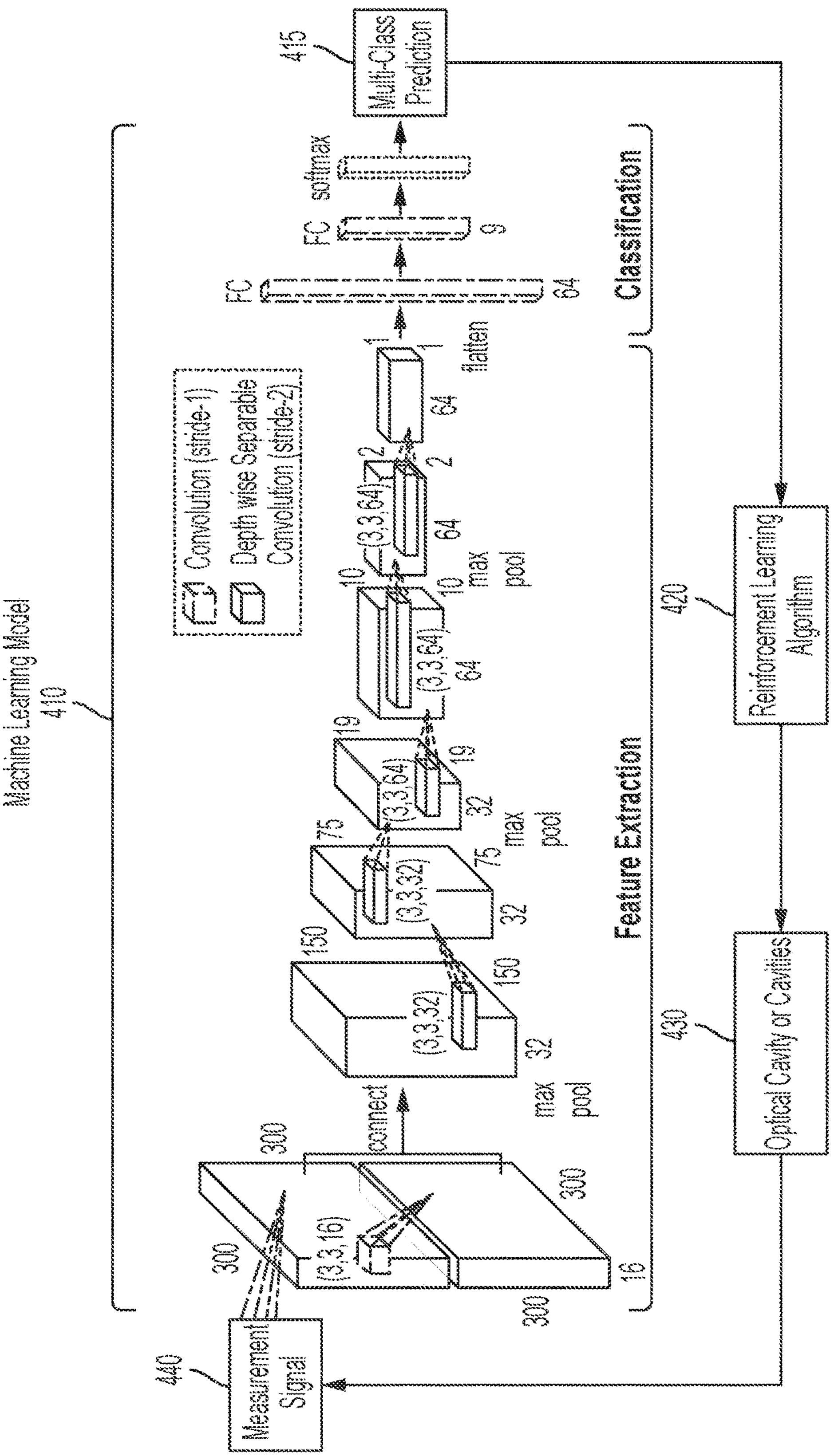
FIG. 4 is a block diagram of an exemplary architecture of a machine learning model for tuning optical cavities, in accordance with some embodiments described herein.

FIG. 4 is a block diagram of an exemplary architecture of a machine learning model 400 for tuning optical cavities, in accordance with some embodiments described herein. The machine learning model 410 may be implemented as a part of optical cavity tuning facility 122, in some embodiments.

In some embodiments, the machine learning model 410 may be a convolutional neural network (CNN) having a number of layers. The machine learning model 410 may receive as input a measurement signal 440 from the optical cavity or cavities 430. The machine learning model 410 may pass the input measurement signal 440 through the layers of the machine learning model 410 and output a multi-class prediction 415.

In some embodiments, the machine learning model 410 may be implemented as a two-dimensional CNN having the following architecture:

1. Two Convolution Layers, concatenated, kernel size: 3×3, stride=1, 16 features
2. Max Pool Layer
3. Depth-wise Separable Convolution Layer, kernel size: 3×3, stride=2, 32 features
4. Depth-wise Separable Convolution Layer, kernel size: 3×3, stride=2, 32 features
5. Max Pool Layer
6. Depth-wise Separable Convolution Layer, kernel size: 3×3, stride=2, 64 features
7. Depth-wise Separable Convolution Layer, kernel size: 3×3, stride=2, 64 features
8. Max Pool
9. Depth-wise Separable Convolution Layer, kernel size: 3×3, stride=2, 64 features
10. Depth-wise Separable Convolution Layer, kernel size: 3×3, stride=2, 64 features
11. Flatten to a 1-dimensional vector
12. Fully Connected Layer to 64 features
13. Fully Connected Layer to 9 features
14. Softmax Layer It should be appreciated that the above neural network architecture is by way of example only, and that machine learning model 410 may have any other suitable architecture, as aspects of the technology described herein are not limited in this respect.

Figure 5:
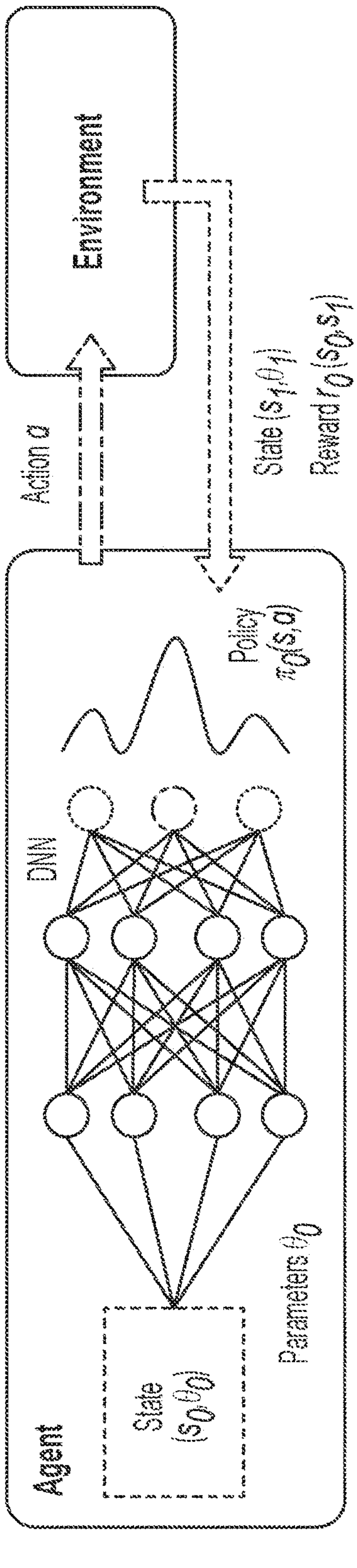
FIG. 5 is a block diagram of an exemplary reinforcement learning algorithm for tuning optical cavities, in accordance with some embodiments described herein.

In some embodiments, reinforcement learning algorithm 420 may use multi-class prediction 415 to determine which, if any, parameters of the optical cavity or cavities 430 should be altered to tune the optical cavity or cavities 430. A schematic diagram of an illustrative reinforcement learning (RL) algorithm 500 is shown in FIG. 5. RL algorithms function by assigning an appropriate reward metric to environment states and subsequently taking actions to maximize the reward. The RL algorithm 500 is provided an initial environment state $s_0$ by the environment 520. The agent 510 follows the learned policy $\pi_\theta$ to take an action $\alpha$ that maximizes the reward $r_0$. The action a changes the environment's state to $s_1$, and the reward $r_0$ is calculated and provided to the agent to train the policy $\pi_\theta$. In some embodiments, and in the context of optical cavity alignment, the reward $r_0$ may be defined as a function of the output beam quality from the optical cavity or cavities. An assessment of the output beam quality is performed by the machine learning model 410, which analyzes the measurement signal 440 and provides an assessment to the reinforcement learning algorithm 420 in the form of the multi-class prediction 415.

Figure 6A:
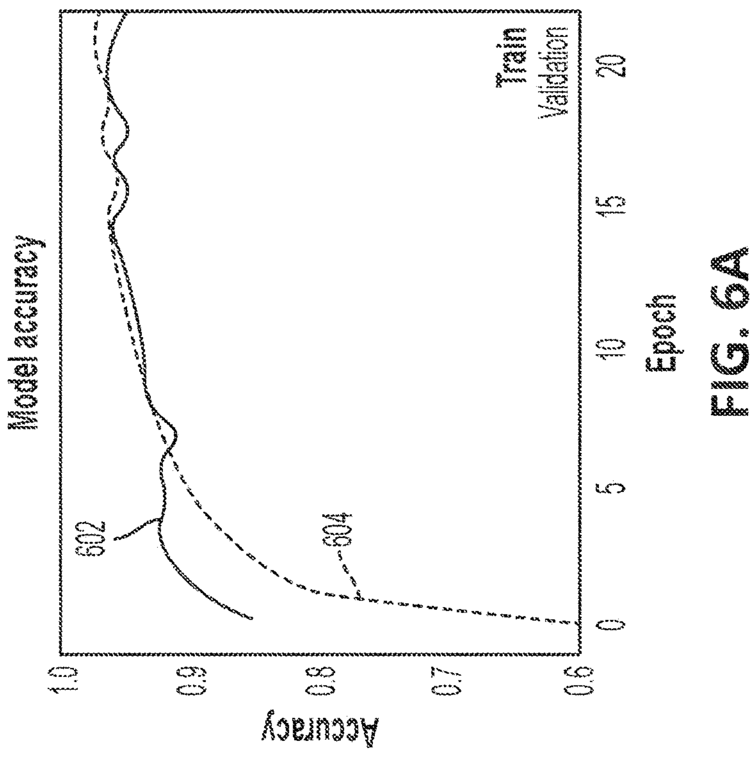
FIG. 6A shows obtained accuracy data of a machine learning model for tuning optical cavities, in accordance with some embodiments described herein.
Figure 6B:
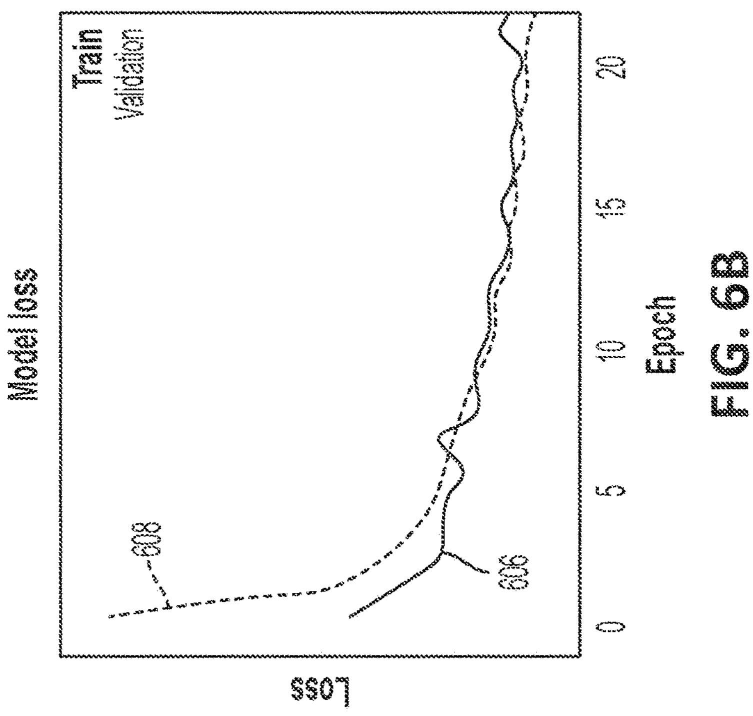
FIG. 6B shows obtained loss data of a machine learning model for tuning optical cavities, in accordance with some embodiments described herein.
Figure 6C:
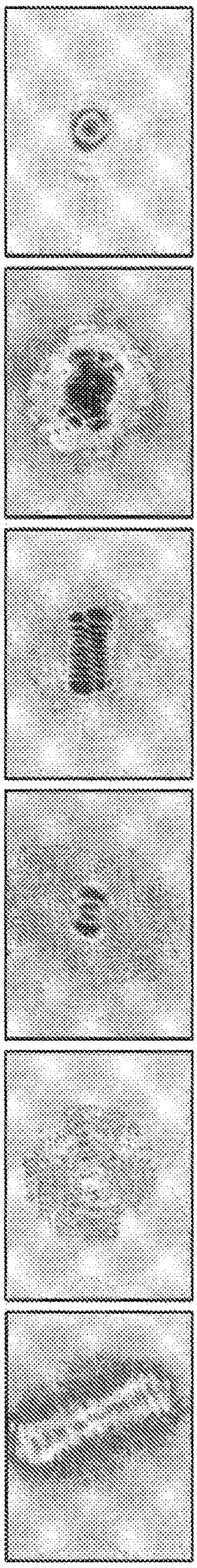
FIG. 6C shows illustrative Hermite-Gaussian optical modes provided as training and testing data to the machine learning model of FIGS. 7A and 7B, in accordance with some embodiments described herein.

FIGS. 6A and 6B show obtained accuracy and loss data for an exemplary machine learning model (e.g., machine learning model 410), in accordance with some embodiments described herein. In FIG. 6A, model accuracy during validation is shown as curve 602 and model accuracy during training is shown as curve 604. In FIG. 6B, model loss during validation is shown as curve 606 and model loss during training is shown as curve 608. The model performance on the test set of images, by optical mode, is provided in Table 1. FIG. 6C shows illustrative Hermite-Gaussian optical modes provided as training and testing data to the machine learning model of FIGS. 6A and 6B, in accordance with some embodiments described herein.

The machine learning model was trained using a training data set of over 5000 (300×300) greyscale 8-bit images of experimental beam modes captured at the output of an optical cavity. These images were input to a two-dimensional CNN including seven convolutional layers, two fully-connected layers, three maxpooling layers, and a softmax layer. The maxpooling layers were configured after convolutional layers 1, 3, and 5. The CNN was regularized using dropout, with a ratio of 0.2 on convolutional layers and 0.5 on fully-connected layers. The training was performed using the stochastic optimization algorithm Adam with a decaying learning rate. Leaky Rectified Linear Unit activation functions were used to restrain the vanishing gradient. It should be appreciated that in some embodiments, sorting may be performed by the RL model. In such embodiments, sorting may be performed based on a number of steps taken by piezoelectric motors driving the mirror mounts of the optical cavities between a current position and a position that produced a $TEM_{00}$ optical mode of the received light.

Results indicate that this model can accurately provide modal composition estimates. The model achieved a sensitivity of above 90% on the holdout set for all classes except the Gaussian HG-mode class, for which the model achieved a sensitivity of 75%.

TABLE 1

| Model Performance on Test Set | | |
|---|---|---|
| Mode (label) | True+ | True− |
| Gaussian $TEM_{00}$ | 75% | 99.9% |
| Near-G $TEM_{01,10}$ | 93% | 99.8% |
| Off-G $TEM_{02,20}$ | 91.8% | 99.4% |
| Low $TEM_{03,30}$ | 96.8% | 99.0% |
| Med $TEM_{11}$ | 94.3% | 99.0% |
| High $TEM_{>21,12}$ | 99.9% | 99.9% |
| Anomaly | 99.9% | 99.7% |

Techniques operating according to the principles described herein may be implemented in any suitable manner. Included in the discussion above are a series of flow charts showing the steps and acts of various processes for tuning an optical cavity. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way.

Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Ubuntu operating system, a Linux distribution developed by Canonical Ltd. based in London, the United Kingdom, or the Windows® operating system, available from the Microsoft® Corporation of Redmond, Washington. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 706 of FIG. 7 described below (i.e., as a portion of a computing device 700) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Figure 7:
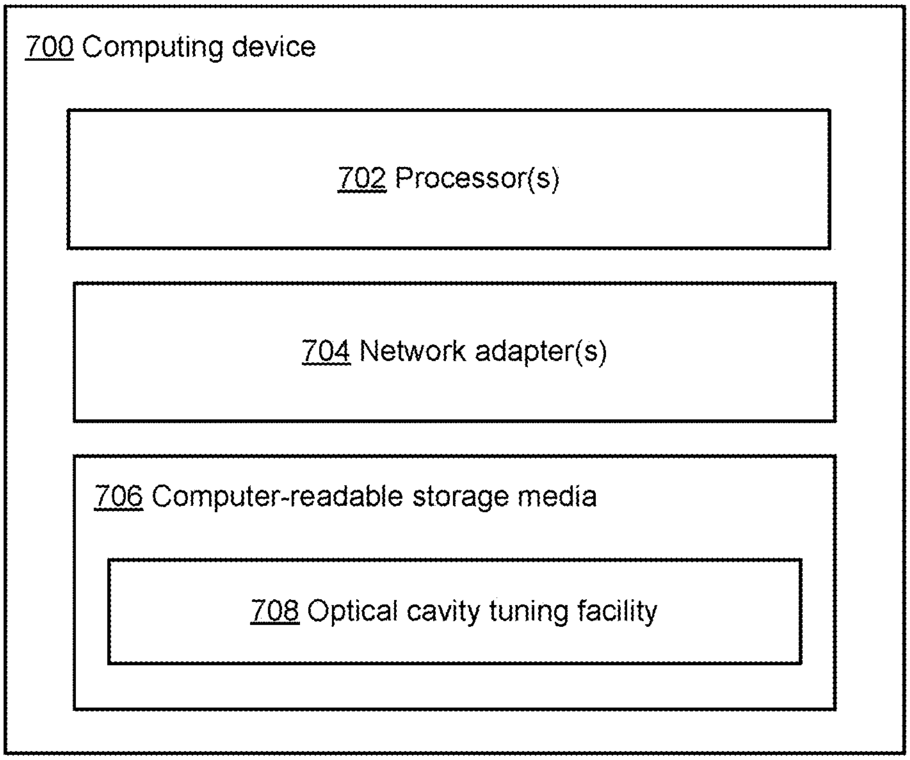
FIG. 7 is a schematic diagram of an illustrative computing device with which aspects described herein may be implemented.

In some, but not all, implementations in which the techniques may be embodied as computer-executable instructions, these instructions may be executed on one or more suitable computing device(s) operating in any suitable computer system, including the exemplary computer system of FIG. 7, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing devices (co-located or geographically distributed) dedicated to executing the techniques described herein, one or more Field-Programmable Gate Arrays (FPGAs) for carrying out the techniques described herein, and/or one or more Graphics Processing Units (GPUs) or any other suitable system.

FIG. 7 illustrates one exemplary implementation of a computing device in the form of a computing device 700 that may be used in a system implementing techniques described herein, although others are possible. It should be appreciated that FIG. 7 is intended neither to be a depiction of necessary components for a computing device to operate as a console for an optical system in accordance with the principles described herein, nor a comprehensive depiction.

Computing device 700 may comprise at least one processor 702, a network adapter 704, and computer-readable storage media 706. Computing device 700 may be, for example, a desktop or laptop personal computer, a personal digital assistant (PDA), a smart mobile phone, a server, a wireless access point or other networking element, or any other suitable computing device. Network adapter 704 may be any suitable hardware and/or software to enable the computing device 700 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 706 may be adapted to store data to be processed and/or instructions to be executed by processor 702. Processor 702 enables processing of data and execution of instructions. The data and instructions may be stored on the computer-readable storage media 706.

The data and instructions stored on computer-readable storage media 706 may comprise computer-executable instructions implementing techniques which operate according to the principles described herein. In the example of FIG. 7, computer-readable storage media 706 stores computer-executable instructions implementing various facilities and storing various information as described above. Computer-readable storage media 706 may store the optical cavity tuning facility 707 and/or measured signals obtained from one or more optical cavities.

While not illustrated in FIG. 7, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

The invention claimed is:

1. A method of tuning an optical cavity, the method comprising:

determining a tuning parameter of the optical cavity, wherein determining the tuning parameter comprises:

analyzing, using a convolutional neural network (CNN) model, a measurement signal obtained from the optical cavity to determine a degree of misalignment, wherein determining the degree of misalignment comprises using the CNN model to determine a difference between the measurement signal and a spatial profile image comprising a Gaussian zero-order mode; and determining, using a reinforcement learning (RL) model, the tuning parameter based on the degree of misalignment; and tuning the optical cavity using the tuning parameter.

2. The method of claim 1, further comprising determining, using a machine learning model, when to determine the tuning parameter of the optical cavity based on a threshold transmission value.

3. The method of claim 1, further comprising determining when to determine the tuning parameter of the optical cavity based on a temperature measurement of the optical cavity and/or an environment of the optical cavity.

4. The method of claim 1, wherein tuning the optical cavity using the tuning parameter comprises changing a spacing between cavity walls of the optical cavity based on the tuning parameter.

5. The method of claim 4, wherein changing the spacing between the cavity walls of the optical cavity comprises changing a temperature of the optical cavity and/or changing the spacing between the cavity walls using piezoelectric actuators.

6. The method of claim 1, wherein tuning the optical cavity using the tuning parameter comprises changing a reflectivity of one or more mirrors of the optical cavity based on the tuning parameter by changing a temperature of the optical cavity.

7. The method of claim 1, wherein analyzing the measurement signal comprises analyzing a measurement of light exiting the optical cavity.

8. The method of claim 7, further comprising capturing the measurement of light using a two-dimensional detector array disposed in a plane perpendicular to a direction of the light exiting the optical cavity, wherein capturing the measurement of light comprises capturing a spatial profile of the light exiting the optical cavity.

9. The method of claim 8, wherein capturing a spatial profile of the light exiting the optical cavity comprises capturing information characterizing a transverse-spatial mode of the optical cavity.

10. The method of claim 8, wherein capturing the measurement of light comprises capturing an intensity and/or a power spectrum of the light.

11. The method of claim 10, further comprising periodically obtaining the measurement signal from the optical cavity, classifying the measurement signal using the CNN model, determining the tuning parameter of the optical cavity using the RL model, and tuning the optical cavity.

12. An optical system, comprising:

an optical cavity;

at least one processor coupled to the optical cavity; and at least one computer-readable storage medium storing computer-executable instructions that, when executed by the at least one processor, cause the at least one processor to carry out a method comprising:

analyzing, using a convolutional neural network (CNN) model, a measurement signal obtained from the optical cavity to determine a degree of misalignment, wherein determining the degree of misalignment comprises using the CNN model to determine a difference between the measurement signal and a spatial profile image comprising a Gaussian zero-order mode;

determining, using a reinforcement learning (RL) model, a tuning parameter based on the degree of misalignment; and tuning the optical cavity using the tuning parameter.

13. The optical system of claim 12, wherein determining the tuning parameter comprises generating the tuning parameter using the RL model, the tuning parameter being based on the difference between the measurement signal and the spatial profile image determined by the CNN model.

14. The optical system of claim 12, wherein the optical cavity comprises a high finesse optical cavity.

15. The optical system of claim 14, wherein the high finesse optical cavity comprises an optical cavity comprising a finesse value greater than or equal to 100 and less than or equal to 20,000.

16. The optical system of claim 15, wherein the high finesse optical cavity comprises a Fabry-Perot etalon.

17. The optical system of claim 12, wherein the optical cavity comprises a cavity wall comprising a surface that is flat, concave, convex, and/or a combination thereof.

18. The optical system of claim 17, wherein the surface comprises a reflective coating.

19. The optical system of claim 12, wherein the measurement signal is an image of a spatial profile of light exiting the optical cavity, the image characterizing a transverse spatial mode of the optical cavity.

20. At least one computer-readable storage medium encoded with computer-executable instructions that, when executed by a computer, cause the computer to carry out a method comprising:

analyzing, using a convolutional neural network (CNN) model, a measurement signal obtained from an optical cavity to determine a degree of misalignment, wherein determining the degree of misalignment comprises using the CNN model to determine a difference between the measurement signal and a spatial profile image comprising a Gaussian zero-order mode;

determining, using a reinforcement learning (RL) model, a tuning parameter based on the degree of misalignment; and tuning the optical cavity using the tuning parameter.

* * * * *